3,241,918
METHOD FOR PREPARING BORON NITRIDE
William S. Lenihan, Jr., Fairview Park, and Ronald W. Reidl, Findlay, Ohio, assignors to Union Carbide Corporation, a corporation of New York
Filed May 9, 1962, Ser. No. 193,558
5 Claims. (Cl. 23—191)

This invention relates to a novel method of preparing acicular boron nitride powder particles and to unique bodies hot-pressed from the boron nitride particles so prepared.

Boron nitride has the very valuable property of being able to withstand extremely high temperatures when heated in an inert or reducing atmosphere. Its thermal stability and resistance to oxidizing atmospheres is excellent. As a result of these properties, boron nitride finds many uses as a fabricated refractory material.

Unfortunately, hot-pressed refractory articles made from boron nitride powder particles prepared according to the processes of the prior art have anisotropic thermal expansion properties. In addition, these materials generally suffer from a lack of thermal stability at high temperatures.

The principal object of this invention is to provide a process for producing boron nitride powder particles which may be hot-pressed into a refractory article wherein the coefficient of thermal expansion of said boron nitride article may be varied as desired from high in the direction perpendicular to pressing to equal in both the perpendicular and parallel to pressing directions.

Another object of the invention is to provide a hot-pressed boron nitride refractory article which is thermally stable at relatively high temperatures.

Still another object of the invention is to provide a hot-pressed boron nitride article having isotropic thermal properties.

Broadly stated, the objects of the invention are accomplished by varying the size of acicular melamine diborate crystals which are formed by the reaction between boric acid and melamine in a hot aqueous solution by controlled cooling of the solution. The size controlled crystals of melamine diborate are thermally converted to boron nitride particles which retain the acicular shape of the melamine diborate crystals by heating them rapidly to a temperature of about 950° C. in an inert or nitrogen containing atmosphere. A nitrogen or argon atmosphere is highly acceptable, and an ammonia atmosphere is most preferred. The acicular boron nitride particles thus formed may then be fabricated into bodies of boron nitride by conventional hot pressing techniques.

Figure 1:
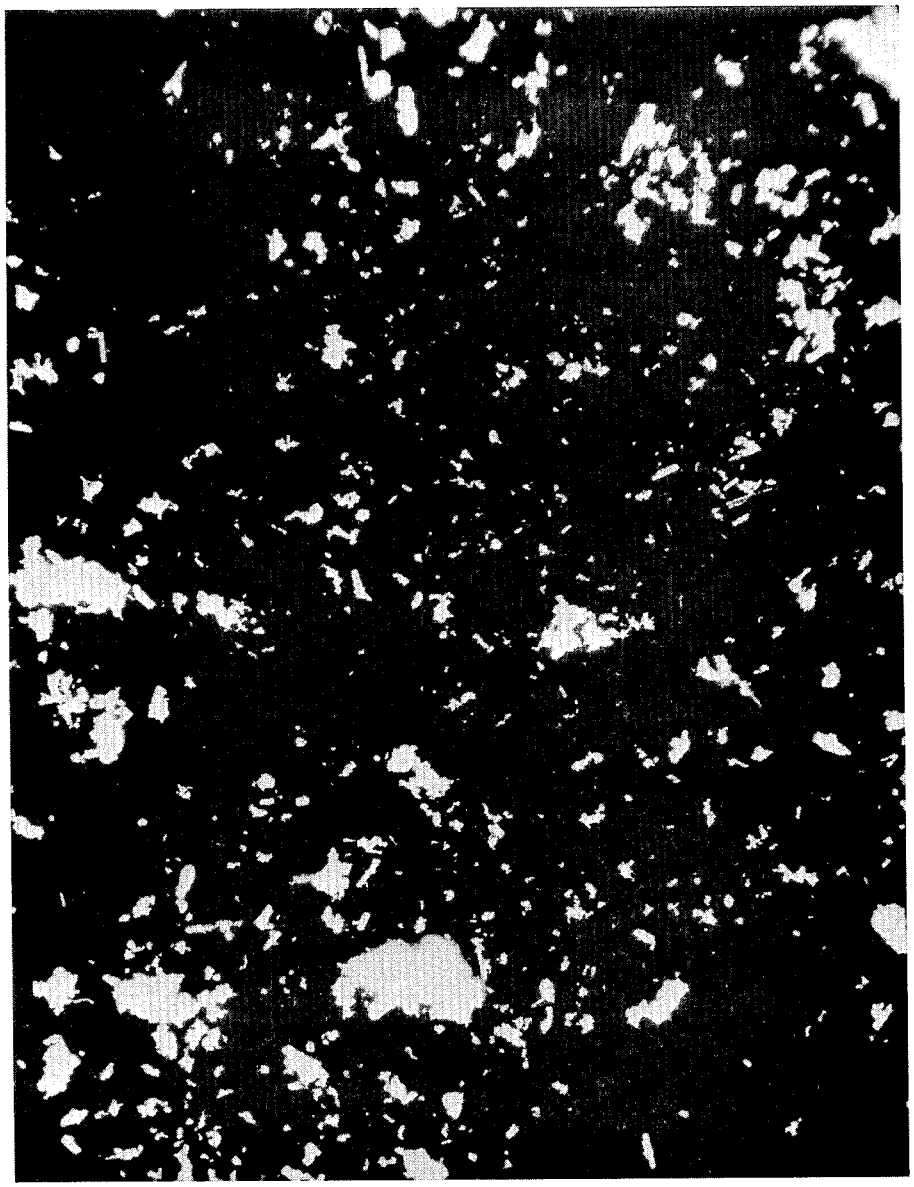
Figure 2:
Figure 3:

In the accompanying drawing, FIG. 1 is a print of a photomicrograph under 100 power magnification of short length acicular melamine borate crystals and agglomerates of short acicular crystals produced during the process of the invention, and FIGS. 2 and 3 are the same for long and mixed length acicular crystals respectively.

It has been determined by the applicants that by controlling the acicular crystal size distribution of melamine diborate used in the preparation of boron nitride acicular particles, it is possible to control the final thermal expansion properties of articles of boron nitride hot-pressed from the boron nitride particles.

The melamine diborate crystal size distribution is controlled primarily by the rate of cooling of the reaction solution of melamine and boric acid and secondarily by the melamine concentration in the solution. In the secondary respect, all other factors being equal, slow cooling of a reaction solution wherein 4 pounds of melamine per 100 pounds of water is added will produce shorter length crystals than the same slow cooling of a reaction solution wherein only 2 pounds of melamine per 100 pounds of water is cooled; the boric acid ratio to melamine ratio being maintained in both cases at approximately a ratio of 2:1.

However, it is primarily the rate of cooling of the reaction solution which determines whether the acicular melamine diborate crystals and subsequently the boron nitride particles will be short, long, or of mixed particle lengths. Since by the practice of this invention the length of the acicular particles may be varied as desired, and since the degree of anisotropy and the thermal stability of boron nitride articles which are hot-pressed from such predetermined boron nitride particles depends on the acicular particle length of the boron nitride (which in turn are dependent on the crystal lengths of the melamine diborate), it is possible by the practice of the invention to produce hot-pressed boron nitride bodies having isotropic thermal properties. In addition, boron nitride bodies having improved thermal stability at relatively high temperatures may be produced.

In the practice of the present invention, a concentrated aqueous solution of boric acid is prepared by dissolving sufficient quantities of boric acid (the term is intended to include its anhydride) in water. The solution is maintained at a temperature of about 95° C. To this solution, melamine is added in a molar ratio of 1:2 to the boric acid. This solution is permitted to react for a short time, and subsequently it is cooled under controlled conditions. The rate of cooling employed is determinative of the length of the acicular crystals of melamine diborate which are recovered.

It has been determined that fast cooling produces primarily short acicular crystals and agglomerates of short acicular crystals growing together in clusters. By fast cooling, it is meant that the aqueous reaction solution of melamine diborate is cooled to a temperature between 20° C. to 40° C. within approximately 30 to 60 minutes after the acicular crystals of melamine diborate are formed. Subsequent to the cooling, the acicular crystals of melamine diborate are immediately removed from the solution, suitably by vacuum filtration, and dried.

Slow cooling produces primarily a distribution of short to long acicular crystals with the long crystals predominating. By slow cooling, it is meant that the aqueous reaction solution of melamine diborate is cooled to a temperature of between 20° C. to 40° C. within approximately 24 hours after the melamine diborate is formed. The cooling rate in the first four hours is preferably about 10° C. per hour. Subsequent to cooling, the acicular crystals of melamine diborate are removed from the solution, suitably by vacuum filtration, and dried.

A combination of fast cooling followed by slow cooling produces a mixture of short acicular crystals, some short acicular crystals growing together as agglomerates, and long acicular crystals. In this type cooling, the aqueous reaction mixture is cooled to a temperature of approximately 40° C. to 60° C. within 30 to 60 minutes after the acicular crystals of melamine diborate are formed. Subsequently, the solution is cooled to room temperature over a period of about 16 hours.

The following are specific examples of the preparation of various length melamine diborate acicular crystals employed in the practice of the invention.

*Example I*

Melamine diborate was prepared by first dissolving 9.2 pounds of boric acid in 38 gallons of 95° C. water, and then adding 9.5 pounds of melamine (3.0 lbs./100 lbs. water). The molar ratio of boric acid to melamine was maintained at 2 to 1. The solution was agitated for 10 minutes, discharged into a 55 gallon polyethylene lined steel drum, and force cooled to a temperature between 20° C. and 40° C. in 40 minutes and immediately filtered. The melamine diborate acicular crystals were separated by vacuum filtration and dried in an oven for 16 hours at between a temperature of about 88° C. and 110° C. The crystals obtained are shown in FIG. 1.

*Example II*

The procedure of Example I was followed except that force cooling was effected at a rate of 10° C. per hour for the first four hours, followed by slow cooling to room temperature over a period of 16 hours. The product is shown in FIG. 2.

*Example III*

The procedure indicated under Example I was again followed except that the solution was forced cooled to 50° C. in 45 minutes, and then cooled slowly over a 16-hour period to room temperature. The product of the example is shown in FIG. 3.

In the practice of the subject invention, melamine diborate acicular crystals prepared as above outlined, are thermally converted to acicular boron nitride particles by rapidly heating them to a temperature of about 950° C. in an inert or nitrogen containing atmosphere. The boron nitride particles thus obtained may be hot-pressed by conventional techniques at a temperature of 1600° C. and a pressure of 2000 p.s.i. to form a boron nitride article having a density of about 2.

As an example, melamine diborate was converted to boron nitride in a 10¼" internal diameter x 108" long electrically heated tube furnace. Seventeen pounds of melamine diborate were charged in a graphite capsule 8⅞" of internal diameter x 19¾" length, which is vented and which contains graphite heat transfer slabs. The capsule was placed in the cold zone of the furnace and the furnace was heated to 1100° C. while an atmosphere of nitrogen was swept through it. When the hot zone in the tube reached 1100° C., the nitrogen atmosphere was replaced by a flow of ammonia gas and the capsule was moved rapidly into the hot zone. The capsule temperature was maintained at 950° C. for 3 hours then allowed to cool in the furnace in an inert atmosphere.

After the reaction was complete, 92% pure boron nitride acicular particles with about 8% boric oxide as an impurity were obtained. The carbon content was less than 0.2%.

As an example of forming a boron nitride article, 1540 grams of boron nitride powder so produced was charged in a 3.3" diameter graphite mold and cold pressed at 1 ton per in.$^2$. The mold was then charged to a graphite tube furnace and hot pressed at 1680° C. with a 1 ton per in.$^2$ pressure and a 1 hour hold at that temperature and pressure. The 3.3" x 5⅛" boron nitride plug which was removed from the mold was found to have a density of 1.98. After machining approximately ⅛" of skin from this plug the density was found to be 2.1. This plug provided test samples for physical property measurements given in the tables below.

With respect to process conditions, during conversion of melamine diborate to boron nitride it is important to have a high rate of temperature rise in the melamine diborate acicular crystals in order to minimize the surface area of the resultant boron nitride acicular particles. In order to insure satisfactory results heating to a temperature of approximately 950° C. should be completed in no longer than about 10 to 15 minutes. The surface area and the purity of the boron nitride particles are a function of the rate of temperature rise. In general, the boron nitride surface area and its purity increase with increasing time to temperature. It has been noted that the higher the boron nitride surface area the greater the tendency for the boron nitride to hydrolyze in air and the more difficult it is to hot press to a satisfactory high density. Thus, high surface area boron nitride particles having a purity ranging from 95 to 98% have been obtained by slowing the temperature rise. These particles cannot be hot pressed to a satisfactory high density. Presumably the high surface area boron nitride particles suffer serious losses of purity due to hydrolysis in air. Therefore, from a handling and hot pressing point of view high surface area boron nitride is not desirable.

As stated above, the thermal coefficient of expansion and thermal stress properties of the hot pressed boron nitride articles of the invention can be pre-determined by using boron nitride acicular particles made from properly selected acicular melamine diborate crystals.

The coefficients of thermal expansion (CTE) and thermal shock properties for articles formed by conversion from the three types of melamine diborate crystals are summarized in Table I. The CTE was determined on ½" x ½" x 2" long samples while heating to 1800° C. in 4 hours.

The reported CTE was arrived at by assuming a straight line or linear function over the indicated temperature range and by dividing the change in expansivity, i.e., change in length divided by original length, by the change in temperature. The thermal stability shock test for thermal stress resistance was performed on 1½" diameter x 2" long samples by heating them to 2000° C. in 2 hours. The same properties are also reported for two type of prior art boron nitride articles. Type A was hot pressed from boron nitride powders made by reacting a dry mixture of melamine and boric acid at a temperature of about 950° C. followed by heat treating the reaction produced at a temperature of about 1400° C., and subsequently water washing so as to remove the excess boric acid. Type B was hot pressed from boron nitride powders made by mixing an oxygen-containing boron compound with an inert diluent comprising an inorganic alkaline earth compound which is infusible and unvolatilized under the conditions of nitriding, and heating the mixture in an atmosphere of ammonia at a temperature of 700° C. to 1100° C. to nitride the oxygen-containing boron compound and form boron nitride.

TABLE I

*Density, CTE and thermal stability properties of boron nitride articles*

| Type of Acicular Melamine Borate Crystals (Starting Material) | Invention | | | Prior Art | |
|---|---|---|---|---|---|
| | Mixed Length | Long Length | Short Length | A | B |
| Apparent Density | 2.16 | 2.08 | 2.08 | 2.1 | 2.1 |
| CTE Perpendicular to Pressing, cm./cm./°C. X 10⁻⁶—Temperature Range: | | | | | |
| 25–700° C | 2.6 | 4.3 | 4.3 | 3.5 | 0.9 |
| 25–1,000° C | 2.8 | 4.4 | 5.0 | 3.2 | 0.8 |
| 25–1,700° C | 5.9 | 5.3 | 6.5 | 8.4 | |
| CTE Parallel to Pressing, cm./cm./° C. X 10⁻⁶—Temperature Range: | | | | | |
| 25–700° C | 2.6 | 0.7 | 0.7 | 10.6 | 8.1 |
| 25–1,000° C | 2.8 | 1.0 | 1.0 | 10.4 | 7.5 |
| 25–1,700° C | 5.9 | 1.6 | 1.7 | 16.5 | |
| Thermal Stability Heating to 2,000° C. in 2 hours | (¹) | (¹) | (²) | (³) | (⁴) |

¹ No cracks.
² Cracked at 1,500° C.
³ Cracked at 1,300° C.
⁴ Not tested.

It can be seen that mixed melamine diborate acicular crystals produced a boron nitride article with isotropic CTE properties. Short or long length acicular melamine diborate crystals each produced a boron nitride article with the CTE higher in the direction perpendicular to pressing. The prior art boron nitride articles had a CTE higher in the direction parallel to pressing.

The crystalline structure of the malamine diborate also influences the thermal stress properties of a boron nitride article made therefrom. Boron nitride articles made from short length acicular boron nitride particles cracked at 1500° C. on heating to 2000° C. in 2 hours, whereas boron nitride made from both mixed length and from long length acicular boron nitride particles did not crack. Both the long length and short length melamine borate-boron nitride have similar CTE's yet one type did not crack and the other did crack on heating to 2000° C. Evidently, the presence of long length boron nitride acicular particles appears to be responsible for the greater thermal stress resistance.

Tables II and III set forth the modulus of rupture and compressive strength versus temperature both in the direction parallel and perpendicular to the forming pressure for boron nitride articles which were hot pressed from the long length boron nitride acicular particles of the invention and also prior art boron nitride articles. The prior art hot pressed boron nitride articles were produced from boron nitride made by reacting a dry mixture of melamine and boric acid at a temperature of about 950° C. followed by heat treating the reaction product at a temperature of about 1400° C. and subsequently water washing so as to remove the excess boric oxide.

TABLE II

*Modulus of rupture vs. temperature*

| Temp., ° C. | Invention | | Prior Art | |
| --- | --- | --- | --- | --- |
| | Parallel (p.s.i.) | Perpendicular (p.s.i.) | Parallel (p.s.i.) | Perpendicular (p.s.i.) |
| 20 | 23,350 | 15,900 | 7,100 | 8,000 |
| 100 | 24,750 | 16,000 | 6,200 | 5,000 |
| 200 | 21,850 | 20,800 | 4,300 | 6,400 |
| 300 | 20,900 | 19,600 | 7,600 | 9,400 |
| 400 | 16,300 | 11,500 | 5,000 | 5,400 |
| 500 | | 7,300 | 3,200 | 3,200 |
| 600 | 6,870 | 5,250 | | |
| 800 | | 3,200 | | |
| 1,000 | 4,170 | 5,640 | 2,000 | 1,600 |

TABLE III

*Compressive strength vs. temperature*

| Temp., ° C. | Invention | | Prior Art | |
| --- | --- | --- | --- | --- |
| | Parallel (p.s.i.) | Perpendicular (p.s.i.) | Parallel (p.s.i.) | Perpendicular (p.s.i.) |
| 20 | 31,400 | 33,400 | 13,700 | 14,200 |
| 100 | 22,700 | 23,400 | 12,400 | 10,600 |
| 200 | 19,000 | 22,100 | 5,680 | 6,810 |
| 300 | 17,100 | 21,600 | 7,600 | 12,500 |
| 400 | 16,200 | 17,600 | 7,530 | 8,085 |
| 500 | 9,790 | 9,930 | 7,525 | 4,850 |
| 600 | 9,160 | 7,310 | | |
| 800 | 6,400 | 6,120 | | |
| 1,000 | 5,610 | 5,890 | 2,300 | 2,900 |

Examination of the strength values shown in Tables II and III clearly shows that hot pressed articles made from long length boron nitride acicular particles are superior at all temperatures up to 1000° C. to the prior art articles.

It is believed that prior to the present invention, hot-pressed boron nitride articles with isotropic coefficients of thermal expansion were never produced. Since boron nitride articles are most frequently utilized at high temperatures, articles possessing isotropic thermal expansion properties possess obvious advantages over prior art boron nitride articles.

We claim:
1. A process for preparing a hot pressed boron nitride article having a coefficient of thermal expansion which may be varied from high in the direction perpendicular to pressing to equal in the direction perpendicular to and parallel to pressing which comprises the steps of producing acicular melamine diborate crystals by reacting melamine and boric acid in a hot aqueous solution, control cooling the reaction mixture to produce short, mixed, or long length acicular crystals of melamine diborate as desired, thermally converting said controlled length acicular crystals of melamine diborate to acicular boron nitride powder particles of the same shape as the starting melamine diborate crystals by rapidly heating them to a temperature of about 950° C. in a suitable atmosphere, and hot pressing said boron nitride particles to form a boron nitride article.

2. The process of claim 1 wherein said thermal conversion of said melamine diborate crystals to said boron nitride particles is conducted in an atmosphere of ammonia.

3. A process for the production of short length acicular boron nitride powder particles which comprises the steps of dissolving melamine in a near boiling aqueous concentrated solution of boric acid, allowing said solution to digest, cooling said solution to 20° C. to 40° C. in from about 30 minutes to about 60 minutes, filtering said solution to remove crystalline melamine diborate therefrom, and thermally converting said crystalline melamine diborate in an ammonia atmosphere to acicular boron nitride particles.

4. A process for the production of long length acicular boron nitride powder particles which comprises the steps of dissolving melamine in a near boiling aqueous concentrated solution of boric acid, allowing said solution to digest, cooling said solution at a rate of about 10° C. per hour for approximately four hours and then slow cooling to about 20° C. to about 40° C. in about 16 hours, filtering said solution to remove crystalline melamine diborate therefrom, and thermally converting said crystalline melamine diborate in an ammonia atmosphere to acicular boron nitride particles.

5. A process for preparing boron nitride having acicular particles of mixed lengths comprising the steps of dissolving melamine in a near boiling aqueous concentrated solution of boric acid, allowing said solution to digest, cooling said solution to about 40° C. to about 60° C. within a period of about 30 minutes to about 60 minutes, then cooling to room temperature over a period of about 16 hours, filtering said solution to remove crystalline melamine diborate therefrom and thermally converting said crystalline melamine diborate in an ammonia atmosphere to acicular boron nitride particles.

References Cited by the Examiner

UNITED STATES PATENTS

| 2,514,132 | 7/1950 | Kienle et al. | 260—249.6 |
| 2,808,314 | 10/1957 | Taylor | 23—191 |

FOREIGN PATENTS

| 1,104,930 | 4/1961 | Germany. |
| 1,112,052 | 8/1961 | Germany. |
| 874,165 | 8/1961 | Great Britain. |
| 875,749 | 8/1961 | Great Britain. |

OTHER REFERENCES

Smolin et al.: "S-Triazines and Derivatives," Interscience Pub. Co. (1959), pages 322–324.

MAURICE A. BRINDISI, *Primary Examiner.*